US009872584B2

(12) United States Patent
Mazzoni et al.

(10) Patent No.: US 9,872,584 B2
(45) Date of Patent: Jan. 23, 2018

(54) MEDIA CARTRIDGE WITH LINEAR, ADJUSTABLE BYPASS

(71) Applicant: 3M INNOVATIVE PROPERTIES COMPANY, St. Paul, MN (US)

(72) Inventors: Justin M. Mazzoni, Cheshire, CT (US); Laurence W. Bassett, Killingworth, CT (US); Hemang R. Patel, Middletown, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 136 days.

(21) Appl. No.: 14/913,812

(22) PCT Filed: Sep. 11, 2014

(86) PCT No.: PCT/US2014/055105
§ 371 (c)(1),
(2) Date: Feb. 23, 2016

(87) PCT Pub. No.: WO2015/038719
PCT Pub. Date: Mar. 19, 2015

(65) Prior Publication Data
US 2016/0353920 A1    Dec. 8, 2016

(51) Int. Cl.
*A47J 31/60* (2006.01)
*B01D 15/36* (2006.01)
(Continued)

(52) U.S. Cl.
CPC .......... *A47J 31/605* (2013.01); *B01D 15/362* (2013.01); *B01D 35/147* (2013.01); *B01J 39/07* (2017.01);
(Continued)

(58) Field of Classification Search
CPC ................. A47J 31/605; B01D 15/362; B01D 2201/302; B01D 35/147; B01J 39/07;
(Continued)

(56) References Cited

U.S. PATENT DOCUMENTS

| 4,820,421 A | 4/1989 | Auerswald |
| 5,167,939 A | 12/1992 | Lohrberg |

(Continued)

FOREIGN PATENT DOCUMENTS

| DE | 199 58 647 | 6/2001 |
| DE | 199 58 648 | 6/2001 |

(Continued)

*Primary Examiner* — Dirk Bass
(74) *Attorney, Agent, or Firm* — Scott A. Baum

(57) ABSTRACT

Provided are media cartridges that have adjustable bypasses using linear movement, and systems and methods that use them. Aspects include an adjustable bypass filter cartridge where a treated stream and an adjusted non-treated stream combine prior to post-filtration and the percentage or ratio of treated the and the non-treated water is adjustable at the time of installation from the outside of the filter cartridge with a known or predictable level of bypass. Media cartridges comprise: an inlet in fluid communication with a feed chamber and an outlet in fluid communication with a mixing compartment; a media compartment containing a media; a bypass port in fluid communication with the feed chamber and the mixing compartment; and a bypass regulator that is adjustable by linear movement. Such cartridges maybe adjusted to meet the needs of a wide variety of end uses.

16 Claims, 5 Drawing Sheets

(51) Int. Cl.
*B01J 39/04* (2017.01)
*C02F 1/42* (2006.01)
*B01D 35/147* (2006.01)
*B01J 39/07* (2017.01)
*C02F 1/00* (2006.01)
*C02F 1/28* (2006.01)
*C02F 103/02* (2006.01)

(52) U.S. Cl.
CPC .......... *C02F 1/42* (2013.01); *B01D 2201/302* (2013.01); *C02F 1/001* (2013.01); *C02F 1/283* (2013.01); *C02F 2001/425* (2013.01); *C02F 2103/02* (2013.01); *C02F 2201/006* (2013.01); *C02F 2209/40* (2013.01); *C02F 2301/043* (2013.01); *C02F 2307/10* (2013.01); *C02F 2307/12* (2013.01)

(58) Field of Classification Search
CPC .. C02F 1/001; C02F 1/283; C02F 1/42; C02F 2001/425; C02F 2103/02; C02F 2201/006; C02F 2209/40; C02F 2301/043; C02F 2307/10; C02F 2307/12
See application file for complete search history.

(56) References Cited

U.S. PATENT DOCUMENTS

| | | |
|---|---|---|
| 5,770,054 A | 6/1998 | Ardes |
| 5,897,770 A | 4/1999 | Hatch |
| 7,455,769 B2 | 11/2008 | Heitele |
| 8,252,173 B2 | 8/2012 | Scholz |
| 2004/0129627 A1 | 7/2004 | McGibbon |
| 2005/0011825 A1 | 1/2005 | Hoffmeier |
| 2007/0227963 A1 | 10/2007 | Fick |
| 2008/0087338 A1 | 4/2008 | Van De Moortele |
| 2008/0087597 A1 | 4/2008 | Johann |
| 2009/0057213 A1 | 3/2009 | Schiavon |
| 2010/0059424 A1 | 3/2010 | Scholz |
| 2010/0326898 A1 | 12/2010 | Scholz |
| 2011/0005988 A1 | 1/2011 | Bassett |
| 2011/0309024 A1 | 12/2011 | Athanasiadis |
| 2012/0118809 A1 | 5/2012 | Bauer |

FOREIGN PATENT DOCUMENTS

| | | |
|---|---|---|
| DE | 10 2009 013375 | 9/2010 |
| JP | H09-174050 | 7/1997 |
| WO | WO 2004/007374 | 1/2004 |
| WO | WO 2008/098952 | 8/2008 |
| WO | WO 2009/101188 | 8/2009 |

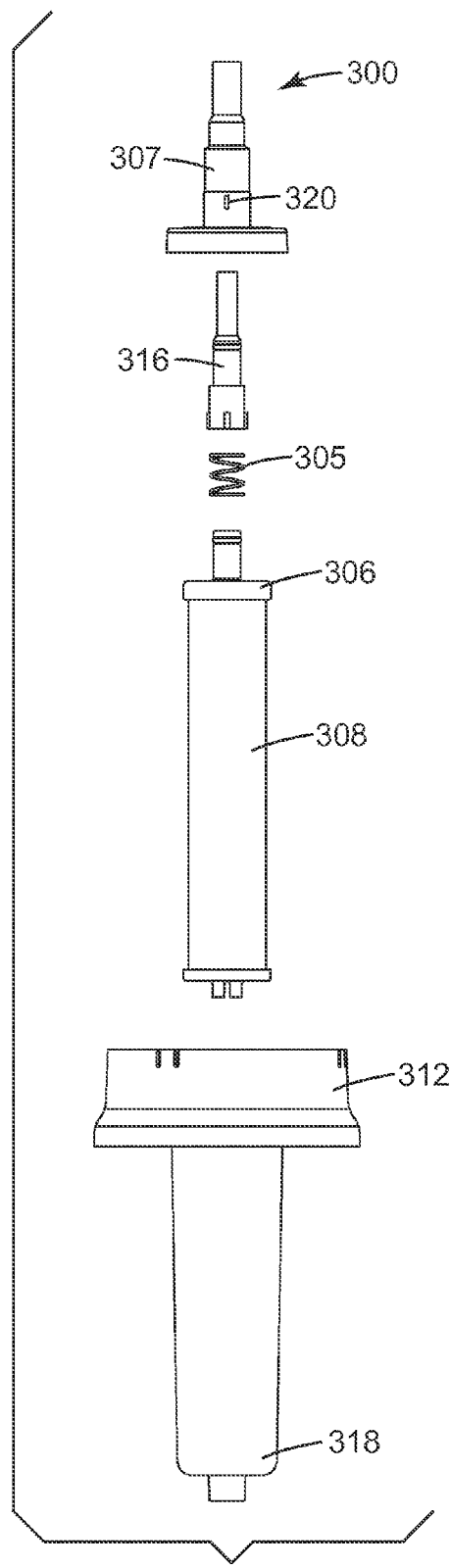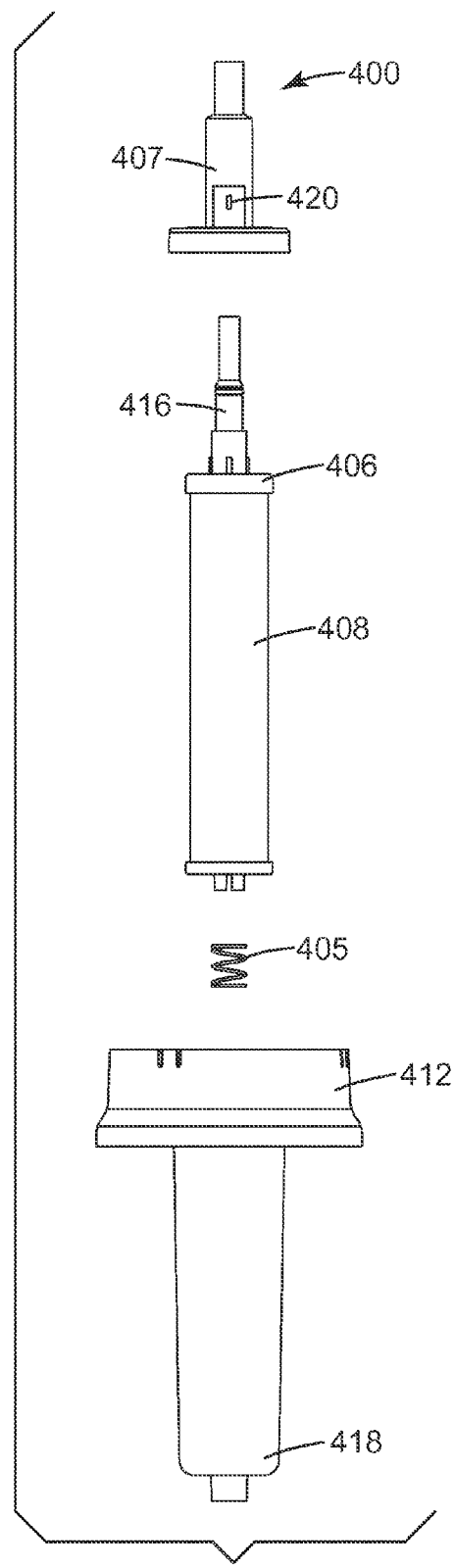

MEDIA CARTRIDGE WITH LINEAR, ADJUSTABLE BYPASS

TECHNICAL FIELD

This disclosure relates to media cartridges containing media used for filtering fluids, and systems using the same. In particular, filter cartridges contain media, such as ion exchange resin, and an adjustable bypass. These filter cartridges are useful for water softening/scale reduction applications.

BACKGROUND

Water softening and/or scale reduction filters are used for making beverages in the restaurant and service industries. Ion exchange materials, such as weak acid cation (WAC) exchange resins, are typically used to exchange hardness minerals (calcium and magnesium) from water with hydrogen or sodium. This results in water with lower scaling potential and use of such water reduces prematurely scaling and maintenance of beverage equipment, including coffee equipment.

If the WAC exchange resin removes all of the hardness minerals, however, the ability of that water to extract coffee from the coffee-beans may be somewhat compromised, and the taste of the beverage could be adversely affected. Some residual hardness in water used to make beverages is preferred and various beverages require their own hardness specification in water.

There is a need to provide media cartridges and systems that are adjustable to meet desired hardness requirements.

SUMMARY

Provided are media cartridges that have adjustable bypasses, and systems and methods that use them. The ability to adjust flow through treatment resin, such as weak acid cation (WAC) resin, is specifically valued by those users who provide hot beverages as well as those who use the same water source for multiple types of equipment (ex: steamers, ice makers, espresso machines, and the like). Having an adjustable bypass that is readily moved to provide a known amount of bypass facilitates meeting the needs of such users. An adjustable bypass will allow a user to protect downstream equipment from scaling while also maintaining a minimum water hardness for desired beverage flavor. In a first aspect, a media cartridge comprises: an inlet in fluid communication with a feed chamber and an outlet in fluid communication with a mixing compartment; a media compartment containing a media; a bypass port in fluid communication with the feed chamber and the mixing compartment; and a bypass regulator that is adjustable by linear movement; wherein a first fluid path is defined by the feed chamber and the media compartment such that fluid flowing through the first fluid path contacts the media to form a treated fluid that enters the mixing compartment; and a second fluid path is defined by the feed chamber and the bypass port such that fluid flowing through the second fluid path does not contact the media and is untreated upon entry into the mixing compartment.

Other features that may be used individually or in combination with respect to any aspect of the invention are as follows. The mixing compartment may comprise an insert therein that is in fluid communication with the media compartment and the bypass port, the insert comprising the bypass regulator and a filter element in a filter element cover.

The bypass regulator may be adjustable by either translation or rotation of a drive. The bypass regulator may comprise a valve and the insert further comprises the bypass port, a first end cap of the filter element affixed thereto, an end cap sleeve, and an elastic device. The valve in conjunction with the elastic device may move linearly upon application of force to the valve by a drive.

The valve may comprise the bypass port, and in a closed position, a portion of the first end cap blocks the bypass port; and in an open position, bypass port is unblocked. The end cap sleeve may comprise the bypass port, and in a closed position, a portion of the valve or the first end cap blocks the bypass port; and in an open position, bypass port is unblocked.

The elastic device may be a spring. The spring may be assembled with the first end cap. The spring may be assembled with the end cap sleeve. The spring may be assembled with a second end cap of the filter element.

The media cartridge may further comprise a conduit connected to the mixing compartment such that treated fluid passes through the conduit before entering the mixing compartment.

In a specific aspect, provided is an ion exchange resin cartridge comprising: an inlet in fluid communication with a feed chamber and an outlet in fluid communication with a mixing compartment that optionally contains an insert comprising a filter element in a filter cover; a media compartment containing one or more ion-exchange resins; a bypass port in fluid communication with the feed chamber and the mixing compartment; and a bypass regulator that is adjustable by linear movement; wherein a first fluid path is defined by the feed chamber and the media compartment such that fluid flowing through the first fluid path contacts the one or more ion-exchange resins to form a treated fluid that enters the mixing compartment; and a second fluid path is defined by the feed chamber and the bypass port such that fluid flowing through the second fluid path does not contact the media is untreated upon entry into the mixing compartment.

Another aspect provides a beverage preparation system comprising: any ion exchange cartridge disclosed herein wherein the ion-exchange resin comprises a weak acid cation (WAC) exchange resin; and wherein the system is effective to provide water having a desired hardness.

In another aspect, provided is a method of fluid treatment comprising: passing a fluid through an inlet of a media cartridge and into a feed chamber; flowing a first portion of the fluid from the feed chamber through a media compartment containing a media to form a treated fluid and flowing the treated fluid into a mixing compartment; flowing a second portion of the fluid that does not contact the media and is an untreated fluid through a bypass port into the mixing compartment; combining the treated fluid and the untreated fluid in the mixing compartment; flowing contents of the mixing chamber through an outlet; regulating flow through the bypass port by using a bypass regulator that is adjustable by linear movement. The method may further comprise filtering the contents of the mixing chamber through a filter element located in the mixing chamber.

Another aspect is a water treatment system comprising: any media cartridge disclosed herein; and a head assembly operatively associated with the media cartridge, the head assembly comprising an unprocessed fluid port, a processed fluid port, a drive, and an adjuster, wherein the drive imparts linear force onto the bypass regulator upon movement of the adjuster. The head assembly may further comprise a vent.

These and other aspects of the invention are described in the detailed description below. In no event should the above summary be construed as a limitation on the claimed subject matter.

BRIEF DESCRIPTION OF THE DRAWINGS

The disclosure may be more completely understood in consideration of the following detailed description of various embodiments of the disclosure in connection with the accompanying drawings, in which:

FIG. 5 is another embodiment of an insert;

FIG. 6 is another embodiment of an insert; and

DETAILED DESCRIPTION

Figure 1:
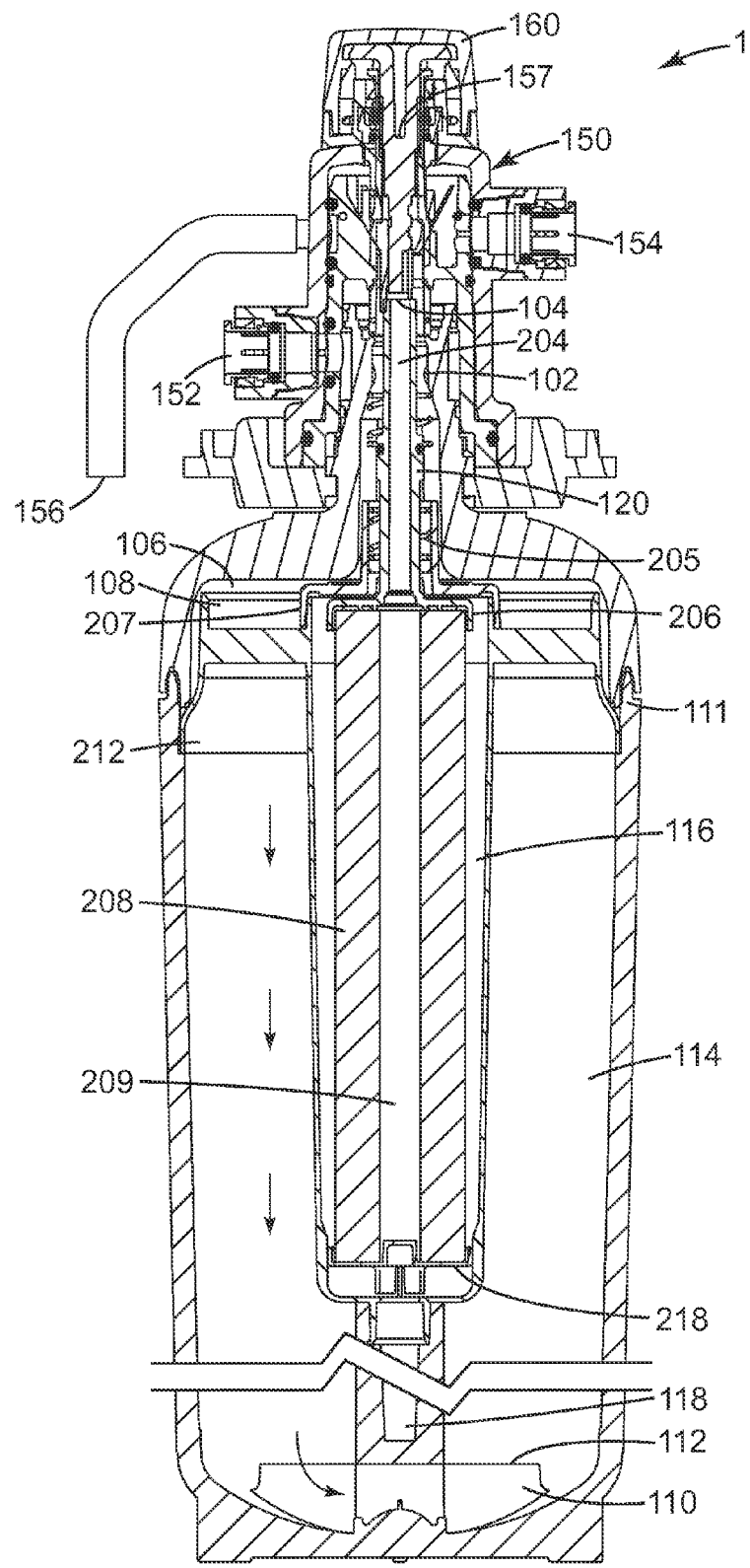
FIG. 1 is a cross-section schematic view of a water treatment system comprising a media cartridge with adjustable bypass and a head assembly.

Before describing several exemplary embodiments of the invention, it is to be understood that the invention is not limited to the details of construction or process steps set forth in the following description. The invention is capable of other embodiments and of being practiced or being carried out in various ways.

Provided are media cartridges that have adjustable bypasses, and systems and methods that use them. Aspects include an adjustable bypass filter cartridge where a treated stream and an adjusted non-treated stream combine prior to post-filtration and the percentage or ratio of treated the and the non-treated water is adjustable at the time of installation from the outside of the filter cartridge with a known or predictable level of bypass. Use of a bypass regulator that operates with linear movement permits easy and precise adjustment from a knob of the head assembly. Specifically, such cartridges allow users to adjust the portion of total fluid, specifically, water that contacts a desired treatment media, such as a weak acid cation exchange resin, while also allowing the total amount of fluid to contact a polishing filter such as a carbon-based filter. Use of an adjustable bypass in a single cartridge while also offering a compartment for polishing allows media cartridges to be provided in an efficient manner. That is, one cartridge can be adjusted to meet the needs of a wide variety of end uses. Cartridges disclosed herein allow an end user to dial in the hardness to the desired specification while also removing any residual chlorine, taste and odor from all of the water.

A normally closed, adjustable bypass regulator that uses a spring for closure is located within the cartridge. A bypass regulator is a structure that controls fluid flow that is bypassing or not contacting a treatment media. An exemplary bypass regulator is a valve. When the cartridge is inserted into the head, a drive in the head pushes on and opens the valve—either directly or indirectly. A portion of incoming water will flow through the valve and bypass the media, for example, ion exchange resin. The height of the drive within the head can be adjusted by a knob located on top of the head. Adjusting the height of the drive will adjust the position of the valve and change the percentage of water flowing through said valve. The drive may be a single structure or post, or it may be a combination of structures. An exemplary drive comprises a rotational drive in combination with a translation drive. In this way, a knob imparts force to the rotational drive, which in turn imparts translational force to the translation drive that moves the bypass regulator, and compresses the spring, with linear movement. Design of the bypass regulator may be tailored to specific media housings and head assemblies. In addition, design of the drive may be tailored to lock its position and maintain the valve opening percentage when an old cartridge is replaced with a new cartridge.

In most applications, all water flowing through the system will pass through a filter element before exiting the cartridge.

The following terms shall have, for the purposes of this application, the respective meanings set forth below.

"Fluid path" refers to the substantially continuous route of a fluid through the cartridge.

"Treated fluid" refers to fluid that has contacted a media to achieve a desired treatment. For example, fluid treated by a weak acid cation (WAC) exchange resin achieves a reduction in hardness.

"Untreated fluid" fluid that bypasses treatment by a media. Both treated and untreated fluid can be purified as needed by a filter such as a carbon-based filter.

The terms "treatment media" and "adsorptive media" include materials (called adsorbents) having an ability to adsorb particles via different adsorptive mechanisms. These media can be in the form of, for example, spherical pellets, rods, fibers, molded particles, or monoliths with hydrodynamic diameter between about 0.01 to 10 mm. If such media is porous, this attribute results in a higher exposed surface area and higher adsorptive capacity. The adsorbents may have combination of micropore and macropore structure enabling rapid transport of the particles and low flow resistance.

"Ion exchange resin" refers to an insoluble matrix (or support structure) normally in the form of small beads fabricated from an organic polymer substrate. The material has a structure of pores on the surface that, upon chemical activation, can comprise exchange sites that trap and release ions.

"Microreticular," used herein to describe ion exchange resins, refers to ion exchange resins having no permanent pore structure. For example, a microreticular may comprise a cross-linked polymer gel having polymeric chains, wherein a pore structure is defined by varying distances between the polymeric chains. Such gels, whose pore structure is subject to variation based on a number of factors, are commonly referred to as gel-type resins.

"Macroreticular," used herein to describe ion exchange resins, refers to ion exchange resins comprising one or more agglomerates of microreticulars. Openings or apertures defined between the agglomerates can give macroreticulars an additional porosity beyond that of their constituent microreticulars.

A "media element" refers to structures that are formed by one or more types of media to achieve filtration and/or treatment of a fluid. The media may provide functionalities including, but not limited to, mechanical filtration, ion exchange, and/or adsorptive capacity.

"Processed fluid" refers to fluid that has contacted a media element to achieve a desired result, such as filtering and/or treatment as described herein.

A "media cartridge" comprises a media element and structures such as end caps to ensure flow of fluid to be processed through the media and out of the cartridge as processed fluid. In some instances, there is a core or other passage internal to the media element of the cartridge for fluid flow.

By "end cap" it is meant a substantially solid piece of material placed at the end of a media block which is dimensioned so as to at least seal the greater portion of the surface area of one or both ends of the block. End caps on either end of a media cartridge may independently have additional features to facilitate installation and/or use of the media cartridge.

"Filtered fluid" refers to fluid that has contacted a separation media or filter element to achieve a desired purity. For example, fluid filtered by a carbon-based filter block that contains separation media may achieve a reduction in sediment, chlorine, and lead.

"Unfiltered fluid" fluid that bypasses treatment by a separation media. Both filtered and unfiltered fluid may be treated as needed by contact with a treatment media.

Media

Examples of suitable media may include cellulosic media, synthetic media, or a combination thereof. The media cartridges may include one or more types of media, including, but not limited to, ion exchange resins, activated carbon, diatomaceous earth, and the like. As to ion exchange resins, the embodiments herein are not limited to the use of any specific ion exchange resin or to any specific combinations of resins. Suitable media for inclusion in an embodiment of the invention may be selected based, at least in part, on the requirements of an intended filtration application. Ion exchange resins suitable for inclusion in the various embodiments of the invention include cationic resin, anionic resin, mixtures of cationic and anionic resins, chelating, or biologically related ion exchange resins. The ion exchange resins may be, for example, microreticular or macroreticular. In some embodiments, the microreticular type is preferred.

Ion exchange resins that may be included in embodiments of the invention include, but are not limited to, those made of cross-linked polyvinylpyrolidone and polystyrene, and those having ion exchange functional groups such as, but not limited to, halogen ions, sulfonic acid, carboxylic acid, iminodiacetic acid, and tertiary and quaternary amines.

Suitable cation exchange resins may include sulfonated phenolformaldehyde condensates, sulfonated phenol-benzaldehyde condensates, sulfonated styrene-divinyl benzene copolymers, sulfonated methacrylic acid-divinyl benzene copolymers, and other types of sulfonic or carboxylic acid group-containing polymers. It should be noted that cation exchange resins are typically supplied with H+ counter ions, NH4+ counter ions or alkali metal, e.g., K+ and Na+ counter ions. Cation exchange resin utilized herein may possess hydrogen counter ions. An exemplary particulate cation exchange resin is MICROLITE PrCH available from PUROLITE (Bala Cynwyd, Pa.), which is a sulfonated styrenedivinyl benzene copolymer having a H+ counter ion.

Other specific examples of cationic ion exchange resins include, but are not limited to, those available under the following trade designations: AMBERJET™ I200(H); AMBERLITE® CG-50, IR-I20(plus), IR-I20 (Plus) sodium form, IRC-50, IRC-50S, IRC-76, IRC-7I8, IRN-77 and IR-I20; AMBERLYST® 15, 15(wet), 15 (dry), 36(wet); and 50 DOWEX® 50WX2-100, 50WX2-200, 50WX2-400, 50WX4-50, 50WX4-100, 50WX4-200, 50WX4-200R, 50WX4-400, HCR-W2, 50WX8-100, 50WX8200, 50WX8-400, 650C, MARATHON® C, DR-2030, HCR-S, MSC-1, 88, CCR-3, MR3, MR-3C, and RETARDION®; PUROFINE PFC100H, PUROLITE NRW100, NRW1000, NRW1100, C100, C145 and MICROLITE PrCH.

Suitable anion exchange resins may include those resins having a hydroxide counter ion whereby hydroxide is introduced during the exchange process. In some embodiments, anion exchange resin comprise quaternary ammomium hydroxide exchange groups chemically bound thereto, e.g., styrene-divinyl benzene copolymers substituted with tetramethylammoniumhydroxide. In one embodiment, the anion exchange resin comprises crosslinked polystyrene substituted with quaternary ammonium hydroxide such as the ion exchange resins sold under the trade names AMBERLYST® A-26-0H by ROHM AND HAAS Company and DOW G51-0H by DOW CHEMICAL COMPANY.

Other specific examples of anionic ion exchange resins include, but are not limited to: AMBERJET™ 4200(CI); AMBERLITE® IRA-67, IRA-400, IRA-400(CI), IRA-410, IRA-900, IRN-78, IRN-748, IRP-64, IRP-69, XAD-4, XAD-7, and XAD-16; AMBERLYST A-21 and A-26 OH; AMBERSORB® 348F, 563, 572 and 575; DOWEX® 1X2-60 100, 1X2-200, 1X2-400, 1X4-50, 1X4-100, 1X4-200, 1X4-400, 1X8-50, 1X8-100, 1X8-200, 1X8-400, 21K CI, 2X8-100, 2X8-200, 2X8-400, 22 CI, MARATHON® A, MARATHON® A2, MSA-1, MSA-2, 550A, MARATHON® WBA, and MARATHON® WGR-2; and MERRIFIELD'S peptide resins; PUROLITE A200, A500, A845, NRW400, NRW4000, NRW6000 and MICROLITE PrAOH. A specific example of mixed cationic and anionic resins is AMBERLITE® MB-3A; PUROFINE PFA600, PUROLITE MB400, MB600, NRW37, NRW3240, NRW3260 and NRW3460.

Suitable chelating exchange resins for removing heavy metal ions may comprise polyamines on polystyrene, polyacrylic acid and polyethyleneimine backbones, thiourea on polystryrene backbones, guanidine on polystryrene backbones, dithiocarbamate on a polyethyleneimine backbone, hydroxamic acid on a polyacrylate backbone, mercapto on polystyrene backbones, and cyclic polyamines on polyaddition and polycondensation resins.

Other specific examples of chelating ion exchange resins include, but are not limited to: PUROLITE S108, S910, S930Plus and S950; AMBERLITE IRA-743 and IRC-748.

Specific examples of biologically related resins that can be used in the processes and products of the invention include, but are not limited to, SEPHADEX® CM C-25, CM C-50, DEAE A-25, DEAEA-50, QAEA-25, QAEA-50, SP C-25, and SP C-50.

The foregoing cationic, anionic, mixed cationic and anionic, and biologically related ion exchange resins are commercially available from, for example, SIGMA-ALDRICH CHEMICAL CO., Milwaukee, Wis., or from ROHM AND HAAS, Riverside, N.J., or from PUROLITE, Bala Cynwyd, Pa.

Additional examples of ion exchange resins include, but are not limited to AG50W-X12, BIO-REX® 70, and CHELEX® 100, all of which are trade names of BIORAD, Hercules, Calif.

Filters

A filter element may be provided for filtration of both treated and untreated fluid. That is, under most circumstances, water flowing through the system will pass through a post filter before exiting the cartridge, but it is understood that a filter element may not be needed for certain applications.

The filter element may comprise particles contained loosely or, preferably, may be a media block formed by particles. Exemplary media particles for use in filter elements include, but are not limited to: activated carbon, polymeric binder, and diatomaceous earth. For example, media comprising activated carbon and polymeric binder particles may form a carbon-based filter block.

In addition, filter elements may include structures, pleated or unpleated, including, but not limited to: a woven structure, a non-woven structure, a microporous membrane, a monolith, a melt-blown fiber (MBF) structure, and an open-cell foam. Exemplary materials of construction of these structure may include, but are not limited to: nylon (e.g., nylon 6,6), ethylene chlorotrifluoroethylene (ECTFE), polypropylene, polyethylene, polyvinylidene fluoride (PVDF), polyethersulfone, polysulfone, polyester, polytetrafluoroethylene (PTFE), polycarbonate, nitrocellulose, cellulose acetate, cellulose, or combinations thereof.

Exemplary filter elements may be: a pleated microporous membrane, a carbon-based filter block, a nonwoven material wrapped around a filter block, and any combination thereof.

Uses

The water treatment systems disclosed herein may be used commercially for providing beverages to consumers. Hot beverages, such as coffee and espresso usually require a certain hardness, whereas steamers and ice makers may have a different requirement. The systems herein with adjustable bypasses are easily and readily used to provide a known amount of bypass facilitates meeting the needs of such users so that one water source may be used for multiple purposes. Choice of a media cartridge and filter element permits addressing any desired filtration and purity goals.

Turning to the figures, FIG. 1 is a cross-section schematic view of a media cartridge 100 with adjustable bypass and a head assembly 150, where fluid, such as water, enters the unprocessed fluid port 152 and then into the cartridge 100 through (cartridge) inlet 102 and into a feed chamber 106. The feed then passes either through a feed separator 108 (optional), which aids in keeping the media from escaping the cartridge or through bypass port 120 into the mixing compartment 116. From the feed separator 108, the fluid flows into the media compartment 114 following the path shown by the arrows. The amount of fluid going into the mixing compartment 116 is related to the flow through bypass port 120, which is regulated by bypass regulator 204 in conjunction with elastic device 205, which may be, for example, a spring. For example, any percentage of fluid (for example, 1 vol. %, 2.5 vol. %, 5 vol. %, 10 vol. %, 20 vol. %, 30 vol. %, 40 vol. %, or even 50 vol. % or more) can bypass treatment by the media.

The media compartment 114 contains a desired media (not depicted) for treating the fluid. A first fluid path is one where fluid contacts the media in the media compartment to form a treated fluid which then enters the mixing compartment 116. A second fluid path is one where fluid does not contact the media, leaving this fluid untreated, and this fluid flows from the feed chamber 106 and into the mixing compartment 116 directly. Treated fluid flows through media separator 112 (optional), which aids in keeping the media from escaping the cartridge, and into the treated chamber 110. Treated fluid then flows through conduit 118 and into the mixing compartment 116. In some embodiments, the treated fluid can flow from the media compartment 114 and into the mixing compartment 116 without the need for a media separator 112, a treated chamber 110, or a conduit 118. Treated and untreated fluids mix in the mixing compartment 116 form an outlet fluid which flows through (cartridge) outlet 104 and processed fluid port 154 and to a point of use or service.

The body or housing 111 of the cartridge typically comprises a top or sump cover and a sump. For some products, these pieces may be formed integrally or be permanently sealed together during manufacturing to form a sealed cartridge/body. As desired, however, these pieces may be separable and even reusable.

In one embodiment, no kind of purification is provided in the mixing compartment 116. In other embodiments, the mixing compartment 116 contains a filter element 208 or other device or media for purifying the fluid. The filter element 208 comprises a first/upper end cap 206 and a second/lower end cap 218 to ensure proper flow through the filter media and into the filter core 209. A filter element cover 212 contains the filter element 208.

The head assembly 150, in addition to providing the unprocessed fluid port 152 and the processed fluid port 154, provides adjuster 60, which specifically may be knob, that is operatively connected to a drive 157. A vent 156 is also part of the head assembly 150.

Figure 2:
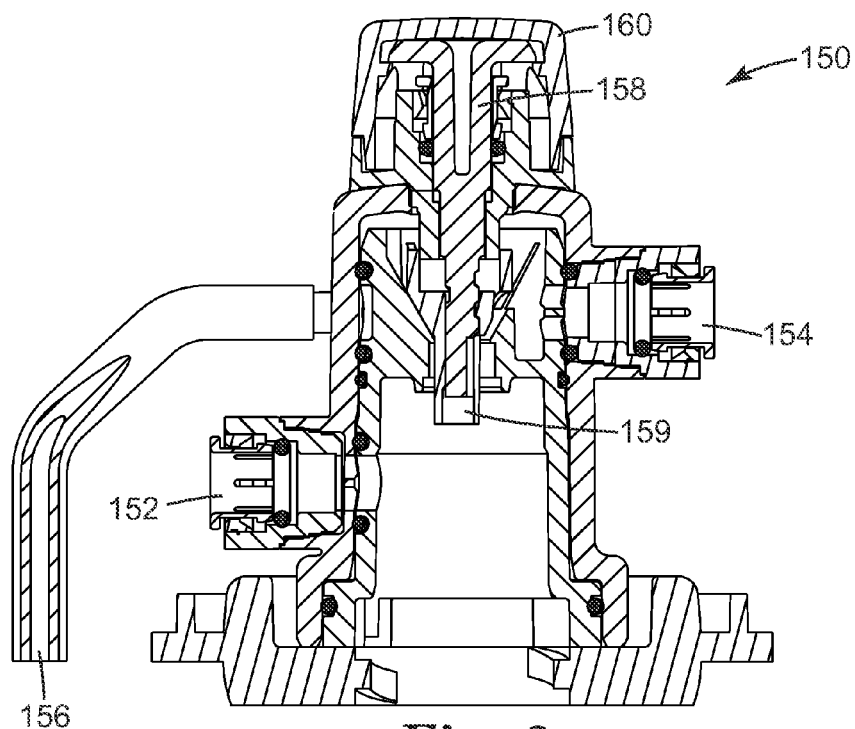
FIG. 2 is a cross-section schematic view of a head assembly according to an embodiment.

FIG. 2 is a close-up, cross-section schematic view of a head assembly 150, where the unprocessed fluid port 152 receives fluid, for example water, to be processed and delivered to the media cartridge. Fluid that has been processed through the media cartridge and optional filter element then exits through the processed fluid port 154 and to a point of service. Vent 156 facilitates flow. Adjuster 160 is operatively connected to the drive, which in this embodiment, is formed of two structures: a rotational drive 158 and a translational drive 159. The adjuster in the form of a knob imparts rotational force, but in the form of a lever, may impart linear force. No matter, upon application of force to the adjuster 160, rotational force is imparted to the rotational drive, which in turn imparts translational force to the translation drive that moves the bypass regulator, and compresses the elastic device, with linear movement.

Figure 3:
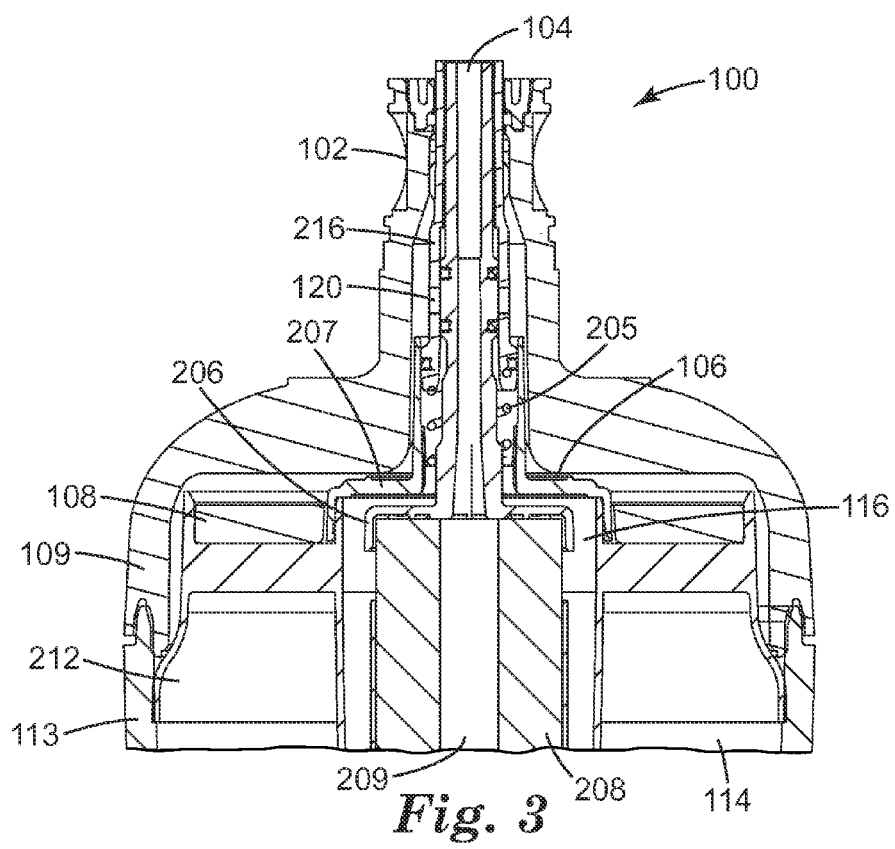
FIG. 3 is a cross-section schematic view of an embodiment of the media cartridge.

FIG. 3 is a close-up, cross-section schematic view of a media cartridge 100, where the inlet 102 receives fluid, for example water, to be processed and the outlet 104 receives processed fluid. Fluid entering the media cartridge 100 passes through the inlet 102 and hits valve 216, which is an exemplary bypass regulator, entering the feed chamber 106. The feed then either passes through the feed separator 108 (optional), which aids in keeping the media from escaping the media compartment 114 or through the bypass port 120 into the mixing compartment 116. The amount of fluid going into the mixing compartment 116 is related to the flow through bypass port 120, which is regulated by the valve 216 in conjunction with the elastic device 205 and with a portion of the first/upper end cap 206, which in this embodiment has an extension with one section having a first, enlarged diameter to block the bypass port 120 when the valve is in one position and a second section have a second, narrower diameter to permit flow through the bypass port 120. End cap sleeve 207 in combination with filter element cover 212 contains the filter element 208. Flow of fluid from the bypass port goes through the outer diameter of the filter element 208 and into filter core 209, out the passage of the end cap 206 to outlet 104. Drive 159 of FIG. 2 imparts linear force on valve 216 of FIG. 3 in order to adjust the amount of bypass fluid flow.

The body or housing of the cartridge typically comprises a top or sump cover 109 and a sump 113.

Figure 4:
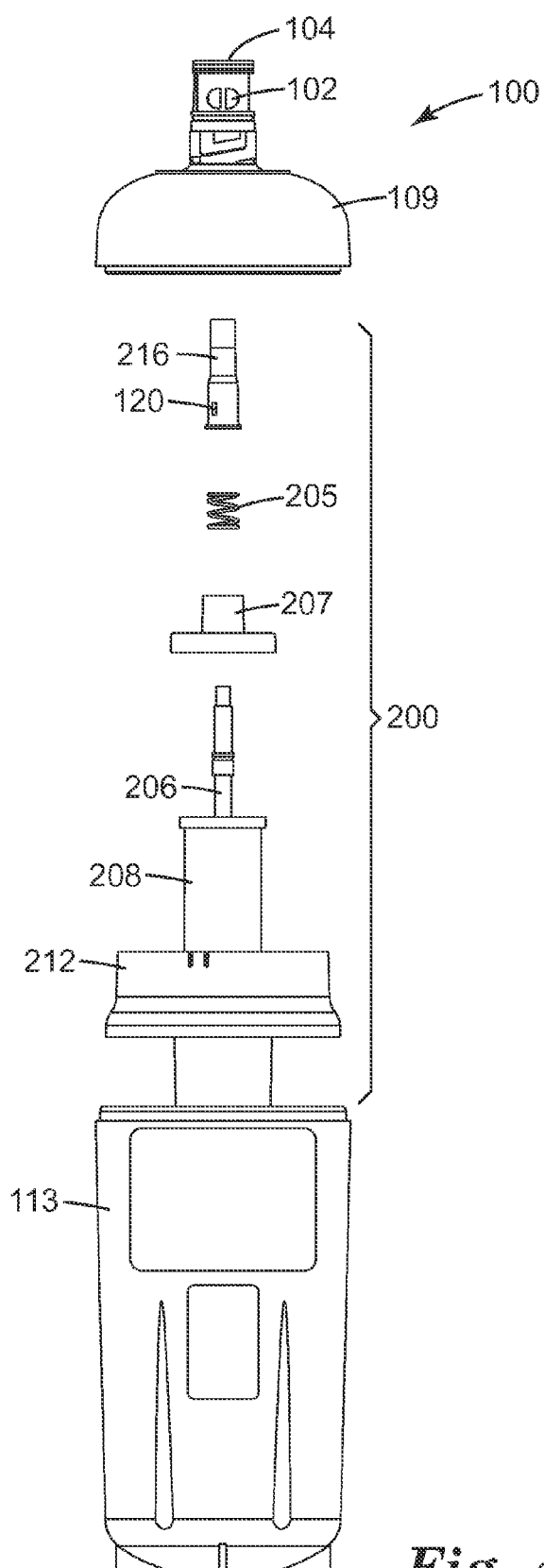
FIG. 4 is an expanded schematic view of an exemplary media cartridge including an embodiment of an insert.

In FIG. 4, an expanded schematic view of an exemplary media cartridge 100 include an embodiment of an insert 200 is provided. Sump cover 109 has the inlet 102 and the outlet 104. The sump 113 contains most of the insert 200 up to about the enlarged diameter portion of the filter cover 112.

Filter cover 112 and end cap sleeve 207 contain the filter element 208 having two end caps, the first/upper end cap 206 extends into the area of the sump cover 109 and the second/lower end cap, which is not shown in this figure. Valve 216 comprising bypass port 120 is adjusted by a portion of the head assembly, for example, a knob, external to the cartridge. Valve 216, moves with linear motion in conjunction with elastic device 205. In this embodiment, the first/upper end cap 206 has an extension with a section of enlarged diameter, which when lined up with the bypass port 120, blocks flow into the mixing chamber. When the bypass port 120 of the valve 216 is not lined up with the enlarged diameter section of the first/upper end cap 206, then flow is permitted into the mixing chamber. This flow may be varied depending on location of the valve/bypass port relative to the enlarged diameter. The extension of the first/upper end cap has a seal, such as an o-ring, to ensure separation of unprocessed fluid from processed fluid. A carbon-containing block is an exemplary filter element 208 that may be contained within the filter element cover 212 and the end cap sleeve 207. The insert 200 is in fluid communication with the conduit 118 depicted in FIG. 1.

In all variations of inserts presented herein, an optional structure such as a spacer may be used to orient the carbon-containing block as desired. Other optional structures may be used in conjunction with the insert to increase accuracy of the valve positioning and/or to help eliminate tolerance stackup, which is accumulated variation in mechanical parts and assemblies that is due to tolerances in specified dimensions.

FIG. 5 shows an expanded schematic view of another exemplary insert 300. Filter cover 312 and end cap sleeve 307 contain the filter element 308 having the first/upper end cap 306 and the second/lower end cap 318. Valve 316 in this embodiment does not comprise a bypass port. Rather end cap sleeve 307 comprises the bypass port 320. Valve 316 is adjusted by a portion of the head assembly, for example, a knob, external to the cartridge. Valve 316, moves with linear motion in conjunction with elastic device 305, which is located adjacent to the valve 316. In this embodiment, there is not an extension of first/upper end cap 306, but it does receive elastic device 305. Valve 316 has a section of enlarged diameter. When the bypass port 320 of the end cap sleeve 307 is not lined up with the enlarged diameter section of the valve, then flow is permitted to the mixing chamber.

FIG. 6 shows an expanded schematic view of another exemplary insert 400. Filter cover 412 and end cap sleeve 407 contain the filter element 408 having the first/upper end cap 406 and the second/lower end cap 418. Valve 416 in this embodiment does not comprise a bypass port and is operatively connected or attached (integrally or removably) to first/upper end cap 406. End cap sleeve 407 comprises the bypass port 420. Valve 416 is adjusted by a portion of the head assembly, for example, a knob, external to the cartridge and moves with linear motion in conjunction with elastic device 405, which is located adjacent to the second/lower end cap 405. In this embodiment, there is not an extension of first/upper end cap 406 due to the presence of valve 416. Either valve 416 or the first/upper end cap 406 has a section of enlarged diameter. When the bypass port 420 of the end cap sleeve 407 is not lined up with the enlarged diameter section of the valve, then flow is permitted into the mixing chamber.

Figure 7:
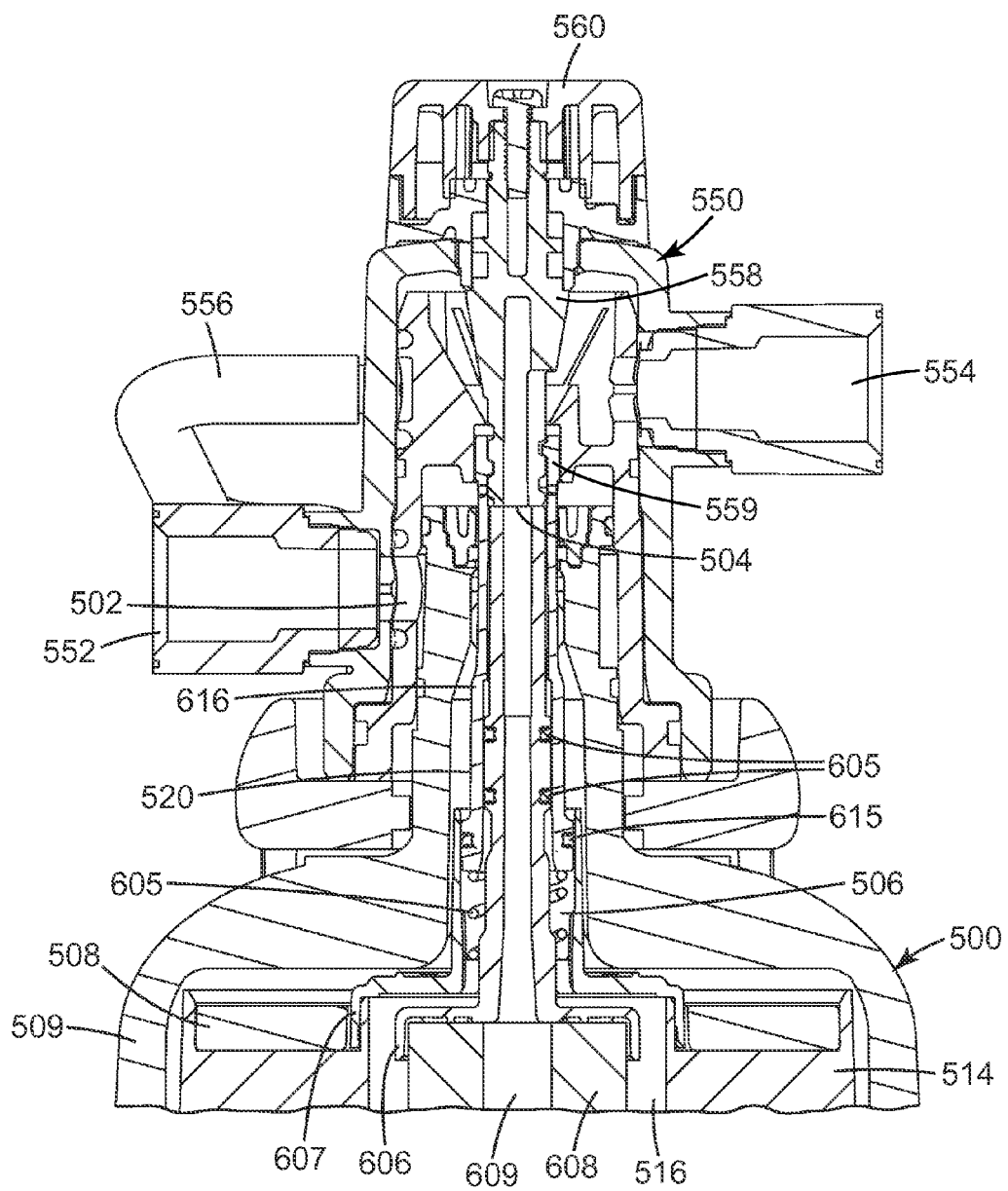
FIG. 7 is a cross-section schematic view of a head assembly in combination with a media cartridge according to an embodiment.

FIG. 7 is a cross-section schematic view of a head assembly 550 in combination with a media cartridge 500, where the unprocessed fluid port 552 receives fluid, for example water, to be processed and delivered to the media cartridge. Fluid that has been processed through the media cartridge and optional filter element then exits through the processed fluid port 554 and to a point of service. Vent 556 facilitates flow. Adjuster 560 is operatively connected to the drive, which in this embodiment, is formed of two structures: a rotational drive 558 and a translational drive 559. Upon application of force to the adjuster 560, rotational force is imparted to the rotational drive, which in turn imparts translational force to the translation drive that moves the bypass regulator, and compresses the elastic device, with linear movement. Media cartridge 500 has inlet 502 for receiving fluid, for example water, to be processed and outlet 504 for receiving processed fluid. Fluid entering the media cartridge 500 passes through the inlet 502 and hits valve 616, which is an exemplary bypass regulator, entering the feed chamber 506. The feed then either passes through the feed separator 508 (optional), which aids in keeping the media from escaping the media compartment 514 or through the bypass port 520 into the mixing compartment 516. The amount of fluid going into the mixing compartment 516 is related to the flow through bypass port 520, which is regulated by the valve 616 in conjunction with the elastic device 605 and with a portion of the first/upper end cap 606, which in this embodiment has an extension with one section having a first, enlarged diameter to block the bypass port 520 when the valve is in one position and a second section have a second, narrower diameter to permit flow through the bypass port 520. Flow of fluid from the bypass port goes through the outer diameter of the filter element 608 and into filter core 609, out the passage of the end cap 606 to outlet 504. Drive 559 imparts linear force on valve 616 in order to adjust the amount of bypass fluid flow. The body or housing of the cartridge typically comprises a top or sump cover 509. One or more o-rings 615 circumscribe the valve 616 and provide a seal with end cap sleeve 607. One or more o-rings 605 circumscribe the extension of the end cap 606 and provide a seal with the valve 616.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A media cartridge comprising:
   An inlet in fluid communication with a feed chamber and an outlet in fluid communication with a mixing compartment;
   A media compartment containing a media;
   A bypass port in fluid communication with the feed chamber and the mixing compartment; and
   A bypass regulator that is adjustable by linear movement, said bypass regulator comprising a valve;
   Wherein the mixing compartment comprises an insert therein that is in fluid communication with the media compartment and the bypass port, the insert comprising the bypass regulator, the bypass port, a filter element in a filter element cover, a first end cap of the filter element affixed thereto, an end cap sleeve, and an elastic device;
   Wherein a first fluid path is defined by the feed chamber and the media compartment such that fluid flowing through the first fluid path contacts the media to form a treated fluid that enters the mixing compartment; and a second fluid path is defined by the feed chamber and the bypass port such that fluid flowing through the second fluid path does not contact the media and is untreated upon entry into the mixing compartment.

2. The media cartridge of claim 1, wherein the bypass regulator is adjustable by either translation or rotation of a drive.

3. The media cartridge of claim 1, wherein the valve in conjunction with the elastic device moves linearly upon application of force to the valve by a drive.

4. The media cartridge of claim 1, wherein the valve comprises the bypass port, and in a closed position, a portion of the first end cap blocks the bypass port; and in an open position, the bypass port is unblocked.

5. The media cartridge of claim 1, wherein the end cap sleeve comprises the bypass port, and in a closed position, a portion of the valve or the first end cap blocks the bypass port; and in an open position, the bypass port is unblocked.

6. The media cartridge of claim 1, wherein the elastic device is a spring.

7. The media cartridge of claim 6, wherein the spring is assembled with the first end cap.

8. The media cartridge of claim 6, wherein the spring is assembled with the end cap sleeve.

9. The media cartridge of claim 6, wherein the spring is assembled with a second end cap of the filter element.

10. The media cartridge of claim 1 further comprising a conduit connected to the mixing compartment such that treated fluid passes through the conduit before entering the mixing compartment.

11. An ion exchange resin cartridge comprising:
    An inlet in fluid communication with a feed chamber and an outlet in fluid communication with a mixing compartment;
    A media compartment containing one or more ion-exchange resins;
    A bypass port in fluid communication with the feed chamber and the mixing compartment; and
    A bypass regulator that is adjustable by linear movement, said bypass regulator comprising a valve;
    Wherein the mixing compartment comprises an insert therein that is in fluid communication with the media compartment and the bypass port, the insert comprising the bypass regulator, the bypass port, a filter element in a filter element cover, a first end cap of the filter element affixed thereto, an end cap sleeve, and an elastic device;
    Wherein a first fluid path is defined by the feed chamber and the media compartment such that fluid flowing through the first fluid path contacts the one or more ion-exchange resins to form a treated fluid that enters the mixing compartment; and a second fluid path is defined by the feed chamber and the bypass port such that fluid flowing through the second fluid path does not contact the one or more ion-exchange resins and is untreated upon entry into the mixing compartment.

12. A beverage preparation system comprising:
    the ion exchange cartridge of claim 11 wherein the ion-exchange resin comprises a weak acid cation (WAC) exchange resin; and
    wherein the system is effective to provide water having a desired hardness.

13. A method of fluid treatment comprising:
    Providing the media cartridge of claim 1;
    Passing a fluid through the inlet of the media cartridge and into the feed chamber;
    Flowing a first portion of the fluid from the feed chamber through the media compartment containing a media to form a treated fluid and flowing the treated fluid into the mixing compartment;
    Flowing a second portion of the fluid that does not contact the media and is an untreated fluid through the bypass port into the mixing compartment;
    Combining the treated fluid and the untreated fluid in the mixing compartment;
    Flowing contents of the mixing chamber through the outlet; and
    Regulating flow through the bypass port by using the bypass regulator that is adjustable by linear movement.

14. The method of claim 13, further comprising filtering the contents of the mixing chamber through the filter element located in the mixing chamber.

15. A water treatment system comprising:
    the media cartridge of claim 1; and
    a head assembly operatively associated with the media cartridge, the head assembly comprising an unprocessed fluid port, a processed fluid port, a drive, and an adjuster, wherein the drive imparts linear force onto the bypass regulator upon movement of the adjuster.

16. The water treatment system of claim 15, wherein the head assembly further comprises a vent.

* * * * *

UNITED STATES PATENT AND TRADEMARK OFFICE
CERTIFICATE OF CORRECTION

PATENT NO. : 9,872,584 B2
APPLICATION NO. : 14/913812
DATED : January 23, 2018
INVENTOR(S) : Justin M. Mazzoni et al.

It is certified that error appears in the above-identified patent and that said Letters Patent is hereby corrected as shown below:

On the Title Page

Item (57), under (Abstract)
Line 6, delete "the and the" and insert -- and the --, therefor.

In the Specification

Column 5
Line 41, delete "polyvinylpyrolidone" and insert -- polyvinylpyrrolidone --, therefor.

Column 6
Line 7, delete "ammomium" and insert -- ammonium --, therefor.

In the Claims

Column 11
Line 18, in Claim 1, delete "An" and insert -- an --, therefor.
Line 21, in Claim 1, delete "A media" and insert -- a media --, therefor.
Line 22, in Claim 1, delete "A bypass" and insert -- a bypass --, therefor.
Line 24, in Claim 1, delete "A bypass" and insert -- a bypass --, therefor.
Line 26, in Claim 1, delete "Wherein" and insert -- wherein --, therefor.
Line 33, in Claim 1, delete "Wherein" and insert -- wherein --, therefor.

Column 12
Line 2, in Claim 11, delete "An inlet" and insert -- an inlet --, therefor.
Line 5, in Claim 11, delete "A media" and insert -- a media --, therefor.
Line 7, in Claim 11, delete "A bypass" and insert -- a bypass --, therefor.
Line 9, in Claim 11, delete "A bypass" and insert -- a bypass --, therefor.
Line 11, in Claim 11, delete "Wherein" and insert -- wherein --, therefor.
Line 19, in Claim 11, delete "Wherein" and insert -- wherein --, therefor.

Signed and Sealed this
Twentieth Day of March, 2018

Andrei Iancu
*Director of the United States Patent and Trademark Office*

CERTIFICATE OF CORRECTION (continued)
U.S. Pat. No. 9,872,584 B2

Line 36, in Claim 13, delete "Providing" and insert -- providing --, therefor.
Line 37, in Claim 13, delete "Passing" and insert -- passing --, therefor.
Line 39, in Claim 13, delete "Flowing" and insert -- flowing --, therefor.
Line 43, in Claim 13, delete "Flowing" and insert -- flowing --, therefor.
Line 46, in Claim 13, delete "Combining" and insert -- combining --, therefor.
Line 48, in Claim 13, delete "Flowing" and insert -- flowing --, therefor.
Line 51, in Claim 13, delete "Regulating" and insert -- regulating --, therefor.